United States Patent
Jakimov et al.

(10) Patent No.: US 10,533,569 B2
(45) Date of Patent: Jan. 14, 2020

(54) SEAL CARRIER, GUIDE VANE RING AND TURBOMACHINE

(71) Applicant: MTU Aero Engines AG, Munich (DE)

(72) Inventors: Andreas Jakimov, Munich (DE); Richard Scharl, Karlsfeld (DE); Steffen Schlothauer, Erdweg (DE)

(73) Assignee: MTU Aero Engines AG, Munich (DE)

( * ) Notice: Subject to any disclaimer, the term of this patent is extended or adjusted under 35 U.S.C. 154(b) by 595 days.

(21) Appl. No.: 15/188,241

(22) Filed: Jun. 21, 2016

(65) Prior Publication Data
US 2016/0377087 A1  Dec. 29, 2016

(30) Foreign Application Priority Data
Jun. 24, 2015 (EP) .................................. 15173497

(51) Int. Cl.
*F04D 29/08* (2006.01)
*F04D 27/00* (2006.01)
*F04D 29/56* (2006.01)

(52) U.S. Cl.
CPC ......... *F04D 29/083* (2013.01); *F04D 27/002* (2013.01); *F04D 29/563* (2013.01); *F05D 2220/323* (2013.01); *F05D 2240/50* (2013.01)

(58) Field of Classification Search
CPC .... F04D 29/083; F04D 29/563; F04D 27/002; F01D 11/001; F16J 15/442; F16J 15/444
See application file for complete search history.

(56) References Cited

U.S. PATENT DOCUMENTS

| | | | | |
|---|---|---|---|---|
| 466,883 | A * | 1/1892 | Bracelet | A44C 13/00 63/10 |
| 4,604,030 | A * | 8/1986 | Naudet | F01D 11/001 415/126 |
| 4,859,143 | A * | 8/1989 | Larrabee | F01D 9/04 415/142 |
| 7,160,078 | B2 * | 1/2007 | Coign | F01D 9/041 29/889.22 |
| 8,206,085 | B2 * | 6/2012 | Ammann | F01D 9/04 415/136 |
| 9,441,501 | B2 * | 9/2016 | Ballard, Jr. | F01D 25/26 |
| 9,528,392 | B2 * | 12/2016 | Casavant | F01D 25/246 |
| 2004/0239040 | A1 | 12/2004 | Burdgick | |
| 2009/0148277 | A1 | 6/2009 | Tholen et al. | |
| 2009/0304497 | A1 | 12/2009 | Meier et al. | |
| 2012/0034086 | A1 * | 2/2012 | Mishrikotkar | F01D 5/3007 416/219 R |
| 2012/0282088 | A1 * | 11/2012 | Stiehler | F01D 9/042 415/209.2 |
| 2014/0037445 | A1 | 2/2014 | Ballad, Jr. et al. | |

(Continued)

FOREIGN PATENT DOCUMENTS

DE  102013213834 A1  2/2015
EP  0298897 A2  1/1989
EP  2236763 A2  10/2010

(Continued)

*Primary Examiner* — Aaron R Eastman
(74) *Attorney, Agent, or Firm* — Barlow, Josephs & Holmes, Ltd.

(57) ABSTRACT

The segmented seal carrier of a guide vane ring of a turbomachine has a number of segments that form two half-rings of the seal carrier when assembled. They are clamped together by their opposite-lying, corresponding lateral contact regions.

11 Claims, 3 Drawing Sheets

(56) References Cited

U.S. PATENT DOCUMENTS

2016/0215646 A1\* 7/2016 Gonyou ................ F01D 11/025

FOREIGN PATENT DOCUMENTS

| EP | 2639411 A1 | 9/2013 | | |
|---|---|---|---|---|
| WO | 2007134585 A1 | 11/2007 | | |
| WO | 2013110792 A1 | 8/2013 | | |
| WO | WO 2015034636 A1 \* | 3/2015 | ............ | F01D 11/025 |

\* cited by examiner

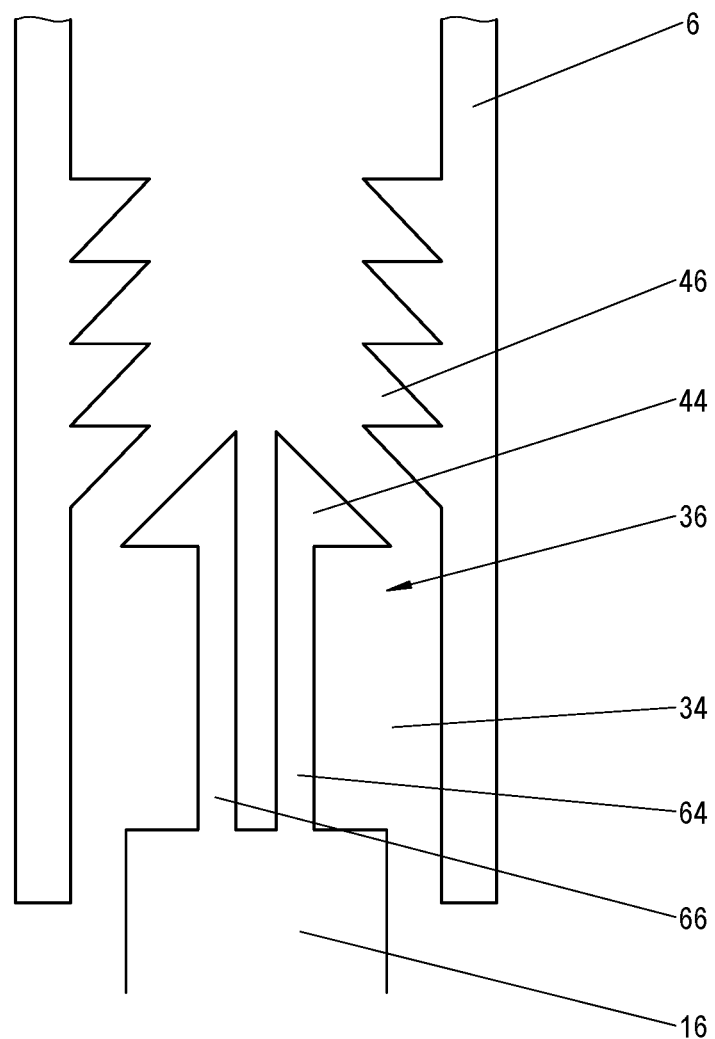
Detail B      Fig. 5

SEAL CARRIER, GUIDE VANE RING AND TURBOMACHINE

BACKGROUND OF THE INVENTION

The invention relates to a segmented seal carrier for a turbomachine according to the present invention, an adjustable guide ring, and a turbomachine.

The seal carrier according to the invention is used as follows, for example, in a turbomachine. For establishing optimal operating conditions, turbomachines such as aircraft engines and stationary gas turbines have, on the compressor side, at least one adjustable row of guide vanes having a plurality of guide vanes that can pivot around their vertical axis. The row of guide vanes forms with an inner ring a so-called adjustable guide vane ring. The inner ring serves for the stabilizing or for the radially inner bearing of the guide vanes. An outer bearing of the guide vanes as well as the actuation thereof is carried out via adjusting journals of the guide vanes that interact with a corresponding adjustment means. On or at the inner ring is guided a seal carrier that is provided with sealing elements or abradable layers, opposite which lie sealing fins on the rotor side.

Basically, the danger of the so-called chording effect is present. The chording effect means a thermal deformation of the inner ring, because its outer side, which is on the side of the hot gas, is heated more intensely than its inner side. The chording effect can lead to the fact that in their contact regions, the segments are pressed radially inward onto opposite-lying sealing fins on the rotor side during transient operating states of the aircraft engine, so that this leads to an increased run-in of the sealing fins into the sealing elements of the seal carrier, especially at the contact regions. In the case of known seal carriers, it is sought to counteract this deformation by a fitting or gland. A gland, however, is relatively expensive and requires space for construction or assembly.

It is pointed out that the above-named prior art is named only by way of example and a seal carrier is not limited to application in an adjustable guide vane ring.

SUMMARY OF THE INVENTION

The object of the invention is to create a segmented seal carrier for a turbomachine that makes possible a reliable joining of its segments, which can be executed in a compact manner and assembly is technically possible with little expenditure. In addition, the object of the invention is to create an adjustable guide vane ring with a compact, segmented seal carrier, and a turbomachine that has a high compressor efficiency.

This object is achieved by a segmented seal carrier, by an adjustable guide vane ring and by a turbomachine of the present invention, discussed in detail below.

A segmented seal carrier according to the invention for a turbomachine has a plurality of segments, which form a seal carrier when assembled, and which have sealing elements formed as abradable layers on the side of the inner periphery. According to the invention, at least two segments are joined together in form-fitting manner in the assembled state by their opposite-lying, corresponding lateral contact regions.

The segments are mutually supported by the form-fitting joining of individual segments, and the rigidity of the seal carrier is increased. The chording effect is thus effectively counteracted. Despite the segmentation, an increased run-in of the sealing fins into sealing elements of the seal carrier is thereby prevented. Preferably, the segments are joined together in a detachable manner, so that a disassembly is possible without destruction. The form-fitting according to the invention thus makes possible a segmentation of the seal carrier into more than just two 180° segments or into more than just two half-rings. For example, the seal carrier can be subdivided into six segments. The segments can thus span six equally large 60° segments or also segments with different peripheral angles. The seal carrier is preferably produced by means of an additive manufacturing method, such as selective laser sintering. In this way, the seal carrier can be adapted structurally and geometrically optimally to its respective site of installation or the size of the guide vane ring. Also, the additive manufacture makes possible the integral or one-piece formation of the contact regions or their form-fitting connections, so that these regions can also be optimally fine-tuned to the respective ring size, and the like.

In the case of a preferred exemplary embodiment, the segments are hooked together or interlocked without play. "Without play" or "in a play-free manner" means that the segments are mutually clamped in the assembled state. In the case of a force action on one of the segments, for example, as a consequence of thermal expansion, the clamping force or resilience is increased by this clamping. In this way, the mechanical form-fitting is improved and the interlocking or joining together of the segments is supported. Due to the absence of play, the rigidity of the segmented seal carrier is increased further, and a bending or arching of the inner ring is prevented in this way.

Preferably, the segments are joined together without tools or aids. "Without tools or aids" means that tools or aids, additional elements, or separate elements, such as screws, wedge elements, and the like, are not necessary for the formation of the form-fitting joining or interlocking. Due to the renouncing of tools or aids such as wedges and screws and the like, the seal carrier can be assembled and disassembled technically with little effort or expenditure. Also, the seal carrier can be executed compactly due to the omission of tools or aids, since a separate construction or assembly space for such tools or aids is absent. Further, due to the omission of tools or aids, the total weight of the seal carrier can be reduced.

In one exemplary embodiment, the contact regions each have an inner segment and an outer segment, wherein the inner segments are pressed against one another in the assembled state and the outer segments are distanced from one another. On the one hand, it is achieved thereby that the segments are somewhat supported on a circular path that promotes a flow of forces. On the other hand, the distancing makes possible a pivoting-out movement and thus a disassembly of the half-rings without destroying them.

The inner segments can have inner surfaces running in the radial direction. Due to the radial orientation of the inner surfaces, a mutual stabilization of the position of the segments is promoted, since none of the segments has surfaces and the like that can lead to a radial displacement.

The assembly of the segments for the seal carrier can be simplified, if the outer segments have arc-shaped outer surfaces. Due to the arc-shaped surfaces, the segments can pivot in, in an arc trajectory, until the segments are mutually installed. Simultaneously, it will be disjoined that the joining of the segments will be disjoined by a linear, radial, or peripheral movement.

In one exemplary embodiment, the outer segment has a greater radial height than the inner segment. The segments are mutually supported on an inner circular trajectory in this way.

Advantageously, the segments form two half-rings of the seal carrier that can be joined together in form-fitting manner. The sealing ring can be sealed over a dividing plane of the housing and additionally reinforced by this measure. In order to equilibrate component and assembly tolerances, it is preferred if the half-rings can be hooked or interlocked in different catch or locking positions.

The assembly of the seal carrier can be further simplified, if sealing elements of the seal carrier are formed integrally on the segments. A seamless connection of the sealing elements with the segments results due to the integral formation. The sealing elements are formed directly during the manufacture of the segments. On the one hand, an individual manufacture of the seal carrier as well as the fastening thereof to the segments is not needed due to this measure. Exemplary sealing elements are sealing honeycombs.

A preferred adjustable guide vane ring has an inner ring for the radially inner bearing of its guide vanes and a seal carrier according to the invention. Such a guide vane ring can be assembled and disassembled with little technical expenditure or effort therefor.

A preferred turbomachine has a guide vane ring according to the invention. Such a turbomachine is characterized by an improved compressor efficiency in comparison to a turbomachine with a conventional guide vane ring, since a narrow radial gap can be adjusted between the sealing elements of the seal carrier and the opposite-lying sealing fins on the rotor side, due to the effectively suppressed chording effect.

Other advantageous embodiment examples of the invention are the subject of additional dependent claims.

BRIEF DESCRIPTION OF THE DRAWING FIGURES

Preferred examples of embodiment of the invention will be explained in more detail in the following on the basis of very simplified schematic illustrations. Herein:

FIG. 5 shows an exemplary embodiment of a joining of half-rings of the seal carrier.

DESCRIPTION OF THE INVENTION

Although the seal carrier according to the invention is explained in the following in reference to an adjustable guide vane ring, the application of the seal carrier is not limited to a guide vane ring, but rather the description is to be seen purely as an example. Basically, each element can be interpreted as a seal carrier that bears a seal, such as, for example, an abradable layer for interacting with opposite-lying sealing fins.

Figure 1:
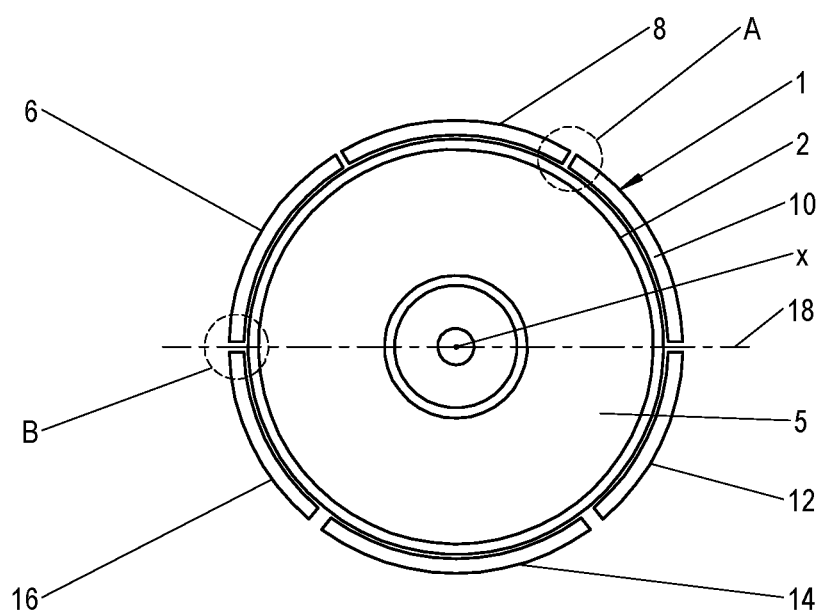
FIG. 1 shows a front view of a segmented seal carrier of a turbomachine according to the invention with reference to sealing fins on the rotor side.
Figure 2:
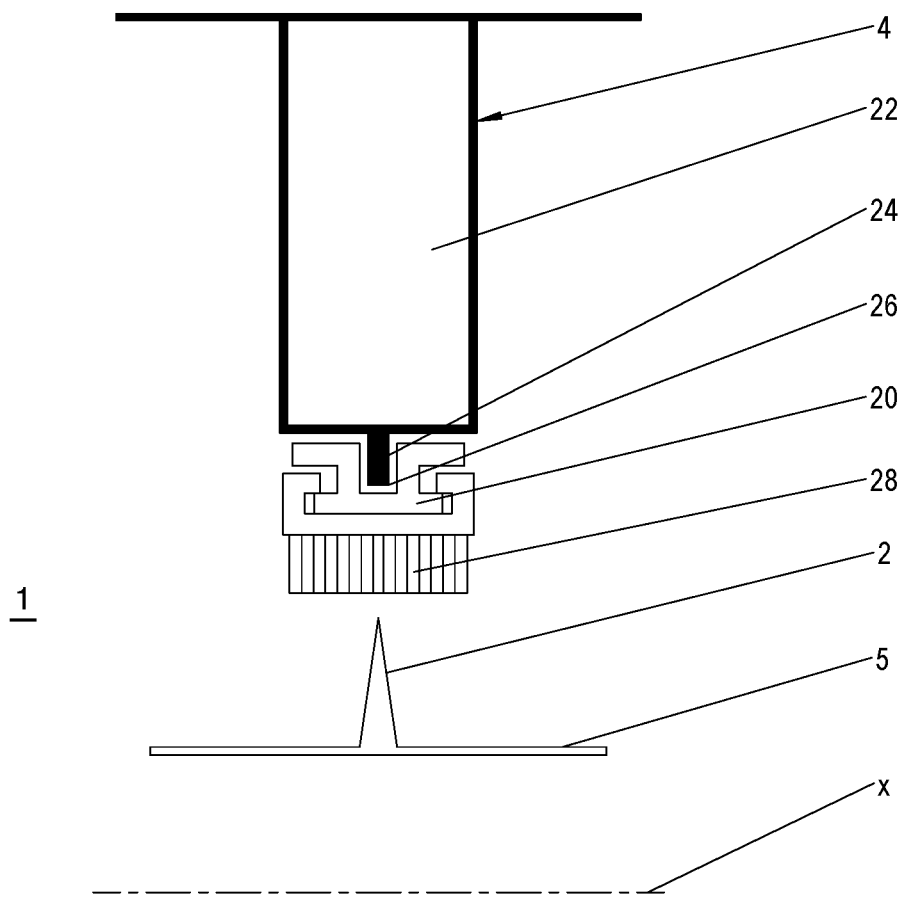
FIG. 2 shows a lengthwise section through the illustration of FIG. 1.

A positioning of a seal carrier 1 according to the invention relative to sealing fins 2 in a turbomachine, for example, an aircraft engine, is shown in greatly simplified manner in FIGS. 1 and 2. The seal carrier 1 forms a part of an adjustable guide vane ring 4, which is disposed on the compressor side in the turbomachine. The sealing fins 2 are disposed on the rotor side and are designed as projections that encircle a rotor 5 rotating around a longitudinal axis x in the turbomachine in the peripheral direction.

The seal carrier 1 has a plurality of segments 6, 8, 10, 12, 14, 16 that form two half-rings of the seal carrier 1 in the assembled state. In the exemplary embodiment shown here, a total of six segments 6, 8, 10, 12, 14, 16 are shown, each of which spans a peripheral angle of 60°. In order to illustrate the individual segments 6, 8, 10, 12, 14, 16, the latter are shown in FIG. 1 distanced from one another in the peripheral direction.

A half-ring is thus composed of three segments 6, 8, 10 or 12, 14, 16. Of course, more than or fewer than six segments 6, 8, 10, 12, 14, 16 that form the seal carrier 1 are also conceivable. In particular, segments 6, 8, 10, 12, 14, 16 can also enclose different peripheral angles. The half-rings lie with their abutting points or contact regions in a dividing plane 18 of the housing of the turbomachine. As is explained further below in the following with reference to FIGS. 3 and 4, segments 6, 8 or 8, 10, or 12, 14 or 14, 16, are joined together in form-fitting manner in the assembled state of the seal carrier 1 without the help of tools or aids, preferably hooked together or interlocked without play, in particular clamped together. The respective interlocking or form-fitting connection can be disassembled in each case, so that in each case the assembled half-ring can also be disassembled again without destroying it. The opposite-lying segments 6, 16 or 10, 12 of the half-rings in the region of the dividing plane 18 of the housing are also joined together in form-fitting manner. A play-free interlocking of these segments 6, 16 or 10, 12 without tools or aids is illustrated in FIG. 5. The segments 6, 8, 10, 12, 14, 16 are hooked together or interlocked without play and are thus clamped together over the complete seal carrier 1 without tools or aids, such as wedges, screws, and the like.

As is shown in FIG. 2, the back side of the seal carrier 1 is moved onto an inner ring 20 of the guide vane ring 4. The inner ring 20 is also composed of at least two ring parts and serves for the radially inner bearing of adjustable guide vanes 22 of the guide vane ring 4. For this purpose, the guide vanes 22 are guided by a radially inner bearing segment 24 in a corresponding recess 26 of the inner ring 20. A radially outer bearing of the guide vanes 22 as well as the actuation thereof is carried out via adjusting journals (not shown) of the guide vanes 22 that interact with a corresponding adjustment means. On the front side, as abradable layers, the seal carrier 1 has shaped sealing elements 28, for example in the form of honeycombs, into which the sealing fins 2 can run in with a relative radial displacement of the rotor 5 as a consequence of flight maneuvers, and the like.

Preferably, the seal carrier 1 is or its segments 6, 8, 10, 12, 14, 16 are additively manufactured components. An exemplary selective manufacturing method is selective laser sintering. Both the lateral contact regions of the segments 6, 8, 10, 12, 14, 16 that will be explained below, as well as the sealing elements 28 are formed integrally or in one piece with the segments 6, 8, 10, 12, 14, 16. The segments 6, 8, 10, 12, 14, 16 with their contact regions and with sealing elements 28 are thus formed in one production step. A separate manufacture, for example, of sealing elements 28, and their subsequent fastening to segments 6, 8, 10, 12, 14, 16 are dispensed with.

Figure 3:
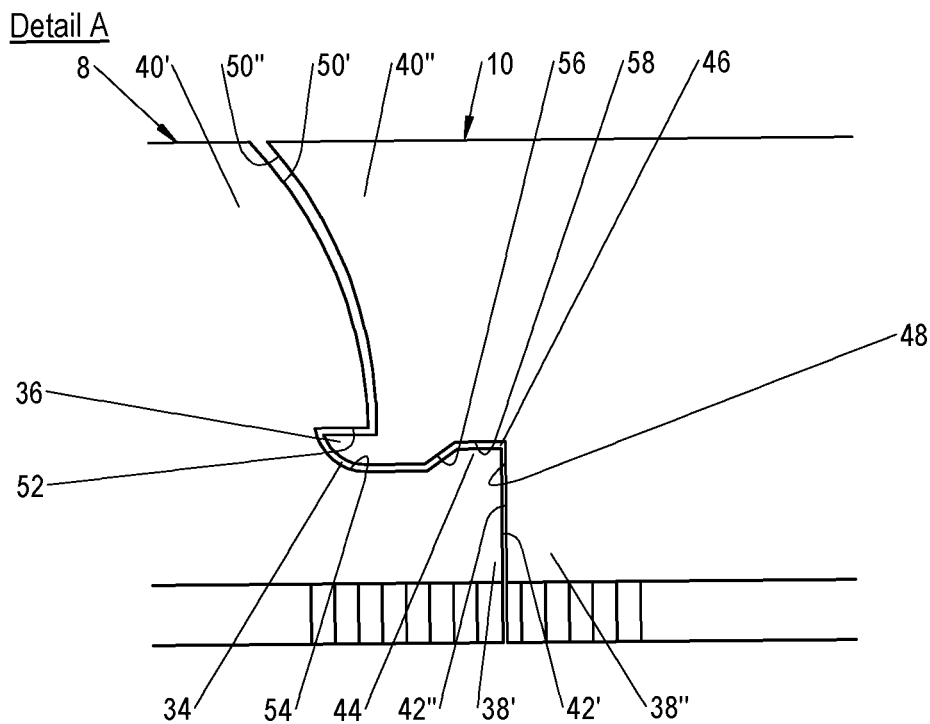
FIG. 3 shows a first exemplary embodiment of a joining of adjacent segments of the seal carrier.

A first exemplary embodiment of an interlocking of adjacent segments 6, 8 or 8, 10, or 12, 14 or 14, 16 of a half-ring is shown in FIG. 3. For example, the interlocking is explained for the segments 8 and 10 that are adjacent to one another in FIG. 1 (detail A).

In order to form the reciprocal interlocking and preferably the mutual clamping, each of the opposite-lying contact regions of segments 8, 10 is formed corresponding to one another or form-fitting with one another so that it can be joined in this way. The interlocking is such that the contact regions are disposed free of play relative to one another in the radial direction as well as in the peripheral direction. Thus the adjacent segments cannot be displaced relative to one another in the radial direction.

In the exemplary embodiment shown in FIG. 3, segment 8 on the left has a depression 34 on the peripheral side and segment 10 on the right has a peripheral-side projection 36 by which it engages in the depression 34. Depression 34 or projection 36 divides the respective contact region into a radially inner region segment or into an inner segment 38', 38" and into a radial outer region segment or into an outer segment 40', 40".

The inner segment 38' of the left-hand segment 8 is formed elongated in comparison to its outer segment 40' in the peripheral direction, while in contrast, inner segment 38" of the right-hand segment 10 is formed stepped back when compared to its outer segment 40". Opposite-lying inner surfaces 42', 42" of the inner segments 38', 38" are formed planar and extend in the radial direction. Also, the left-hand inner segment 38' has a radially outward extending catch piece 44, which engages in a corresponding uptake 46 for the catch piece in the right-hand segment 10. Preferably, the catch piece 44 is disposed on the end of the left-hand inner segment 38' such that it forms a section of the inner surface 42'. The catch uptake 46 thus has a surface segment 48 that forms a part of the right-hand inner surface 42".

The outer segments 40', 40" of the contact regions have outer surfaces 50', 50" that are formed in arc shape, corresponding to a pivoting-in movement of segments 8, 10 relative to one another. They preferably have an equivalent arc trajectory, such that the right-hand outer surface 50" overlaps the left-hand outer surface 50', when considered in the peripheral direction. The left-hand outer surface 50' is thus set back by the depression 34, when considered from the arc shape, and the right-hand outer surface 50" juts forward by projection 36, when considered relative to the arc shape. The outer segments 40', 40" also have a greater radial height than the inner segments 38', 38".

In the assembled state, the projection 36 is disposed in the depression 34 between a radially outer depression surface 52 and an opposite-lying radially inner depression surface 54. The catch piece 44 is disposed in the catch uptake 46 between its surface segment 48 and an opposite-lying boundary surface 56, which is oblique here, of the catch uptake 46. The boundary surface 56 is thus oriented such that the catch uptake 46 becomes wide from the base 58 of the catch uptake radially toward the inside, which facilitates a pivoting in of segments 8, 10.

In combination, the projection 36 is thus disposed in the radial direction between the depression surfaces 52, 54, and the catch piece 44 is disposed in the peripheral direction between the surfaces 48, 56 of the catch uptake. Therefore, a linear displacement of segments 8, 10 relative to one another is effectively prevented by the projection 36 in the radial direction, and a relative linear displacement of segments 8, 10 is effectively prevented by the catch piece 44 in the peripheral direction. A separation of the segments 8, 10 thus interlocked with one another without play is only possible by means of a pivoting-out movement in the direction of the arc-shaped outer surfaces 50', 50". Correspondingly, a joining of the segments 8, 10 is only possible by means of a corresponding pivoting-in movement, which is terminated when the two segments 8, 10 run onto one another. In order to make possible a pivoting-out movement, the outer surfaces 50', 50" are distanced from one another in the peripheral direction in the interlocked state.

Figure 4:
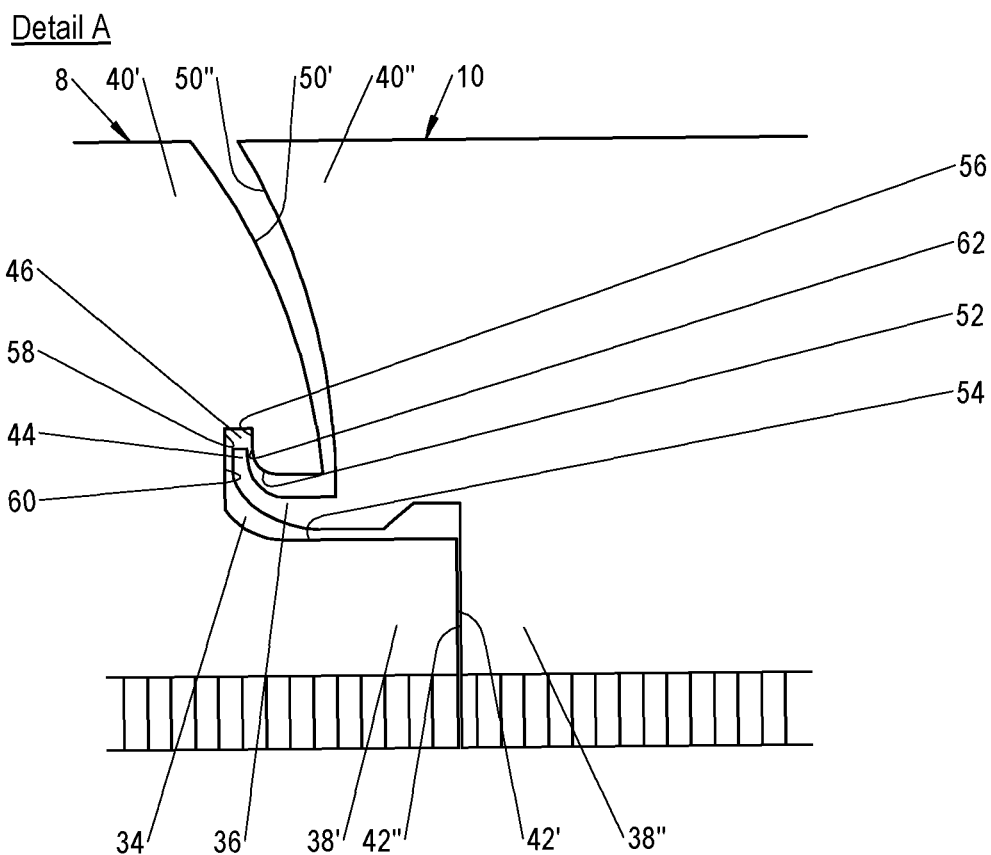
FIG. 4 shows a second exemplary embodiment of a joining of adjacent segments of the seal carrier.

A second exemplary embodiment of an interlocking of adjacent segments 6, 8 or 8, 10, or 12, 14 or 14, 16 of a half-ring is shown in FIG. 4 (detail A). For example, the interlocking is also explained here on the segments 8 and 10 that are adjacent to one another from FIG. 1.

In agreement with the first exemplary embodiment according to FIG. 3, the left-hand segment 8 has a depression 34 in the contact region, and the right-hand segment 10 has a projection 36 projecting into the depression 34.

In further agreement with the first exemplary embodiment according to FIG. 3, also in the case of the second exemplary embodiment, the opposite-lying contact regions of the segments 8, 10 have inner segments 38', 38" with radially running inner surfaces 42', 42" and outer segments 40', 40" with outer surfaces 50', 50", which are formed in arc shape, corresponding to a pivoting-in movement and a pivoting-out movement of segments 8, 10.

Also, the inner segment 38' of the left-hand segment 8 is projecting in the peripheral direction opposite the outer segment 40' of the left-hand segment 8, and the inner segment 38" of the right-hand segment 10 is correspondingly stepped back opposite the outer segment 40" of the right-hand segment 10.

The outer segments 40', 40" also have a greater radial height than the inner segments 38', 38".

As an essential difference relative to the first exemplary embodiment according to FIG. 3, a catch piece 44 of the left-hand segment 8 and a corresponding catch uptake 46 of the right-hand segment 10 are not formed in the region of the inner segments 38', 38". In the second exemplary embodiment, the catch piece 44 is formed as a radially outwardly arc-shaped end section of the projection 36. The catch uptake 46 is formed as a radially outwardly designed enlargement of the depression 34. The enlargement in this case is preferably such that a base 60 of the depression transitions without step into a base 58 of the catch uptake in the radial direction.

A blocking of a radial movement of the two segments 8, 10 relative to one another is given by the projection 36 interacting with a radially inner depression surface 54 and interacting with a radially outer depression surface 52. Based on an overall arc-shaped radially outwardly directed shape of the projection 36, the radially outer depression surface 52 is arc-shaped here, corresponding to the concave surface 62 of the projection 36.

A blocking of a relative movement of the two segments 8, 10 onto one another in the peripheral direction is given by an interaction of the two inner surfaces 42', 42".

A blocking of a relative movement of the two segments 8, 10 away from one another in the peripheral direction is given by an interaction of the end section of the projection 36 formed as catch piece 44 with a boundary surface 56 of the catch uptake 46 lying opposite to the base 58 of the catch uptake.

An exemplary interlocking of the opposite-lying segments 10, 12 or 6, 16 of the half-rings in the dividing plane 18 of the housing is shown in FIG. 5 (detail B). Since an upper half of the housing is lowered onto a lower half of the housing when the housing is closed, a pivoting-in movement of corresponding form-fitting elements is not possible. The form-fitting is therefore produced by a linear movement between the opposite-lying segments 6, 16 or 10, 12.

For example, the lower left segment 16 shown in FIG. 1 is interlocked with the upper left segment 6 as follows:

The lower segment 16 has a projection 36 extending in the peripheral direction by an arrow-shaped catch piece 44 as a head section. The upper segment 6 has a depression 34 as a receiver with a plurality of catch uptakes 46, which lie under one another in the peripheral direction, and into which the projection 36 of the lower segment 16 can be locked in by its catch piece 44 in each case.

The projection 36 is formed like a spring in order to make possible a locking-in. The projection 36 is formed semi-slotted in its longitudinal direction for this purpose. For example, it has two parallelly running, pin-like elements 64, 66, which are distanced from one another via a gap, and the arrow-shaped catch piece 44 is formed on the free ends of the elements, each time in half-arrow shape.

When the upper half of the housing drops down, the projection 36 is inserted into the depression 34 and locks in the catch uptake 46, which corresponds to a placement of the upper housing half onto the lower housing half. Therefore, the half-rings of the seal carrier 1 are also interlocked with one another without play in the peripheral direction and in the radial direction of the seal carrier 1, and the seal carrier 1 is reinforced over the dividing plane 18 of the housing. A segmented seal carrier 1 that is closed or locked over its entire periphery is created in this way, and its rigidity is comparable to a one-part ring.

Disclosed is a segmented seal carrier of a guide vane ring of a turbomachine, having a plurality of segments that form two half-rings of the seal carrier when assembled, and that are clamped together by their opposite-lying, corresponding lateral contact regions.

What is claimed is:

1. A segmented seal carrier of a turbomachine, having a plurality of segments that form the seal carrier when assembled, and that have sealing elements formed as abrasion layers on a side of an inner periphery of the plurality of segments, wherein at least two segments of the plurality of segments are joined together via a pivoting-in movement, such that the at least two segments are joined in a form-fitting manner by respective opposite-lying lateral contact regions in an assembled state, wherein a first corresponding lateral contact region, of the corresponding respective opposite-lying lateral contact regions, has a catch piece and a second corresponding lateral contact region, of the corresponding respective opposite-lying lateral contact regions, has a projection, the catch piece is configured to lock the projection relative to the first corresponding lateral contact region, and wherein, the pivoting-in movement is about an axis which is parallel to a through axis of the assembled seal carrier.

2. The segmented seal carrier according to claim 1, wherein the plurality of segments are interlocked with one another without play.

3. The segmented seal carrier according to claim 1, wherein the plurality of segments are joined together without tools or aids.

4. The segmented seal carrier according to claim 1, wherein each of the contact regions has an inner segment and an outer segment, wherein the inner segments are pressed together in the assembled state, and the outer segments are distanced from one another.

5. The segmented seal carrier according to claim 4, wherein the inner segments have inner surfaces running in a radial direction.

6. The segmented seal carrier according to claim 4, wherein the outer segments have arc-shaped outer surfaces.

7. The segmented seal carrier according to claim 4, wherein for each of the contact regions, the outer segment has a greater radial length than the inner segment.

8. The segmented seal carrier according to claim 1, wherein the at least two segments of the plurality of segments form two half-rings of the seal carrier, these half-rings being able to be joined together in the assembled state without play.

9. The segmented seal carrier according to claim 1, wherein the sealing elements are formed in one piece with the segments.

10. The segmented seal carrier according to claim 1, wherein the seal carrier is disposed in an adjustable guide vane ring having an inner ring for radially inner bearing of its guide vanes.

11. The segmented seal carrier according to claim 10, wherein the guide vane ring disposed in a turbomachine.

* * * * *